United States Patent [19]

Aarts

[11] Patent Number: 4,656,866

[45] Date of Patent: Apr. 14, 1987

[54] METHOD OF MEASURING THE PRESSURE IN A VACUUM PACKAGE

[75] Inventor: Mathias L. C. Aarts, Bilthoven, Netherlands

[73] Assignee: Douwe Egberts Koninklijke Tabaksfabriek-Koffiebranderijen-Theehandel N.V., Netherlands

[21] Appl. No.: 721,296

[22] Filed: Apr. 9, 1985

[30] Foreign Application Priority Data

Apr. 11, 1984 [NL] Netherlands .......................... 8401150

[51] Int. Cl.[4] ............................................. G01M 3/34
[52] U.S. Cl. ........................................ 73/49.3; 73/52
[58] Field of Search ...................... 73/52, 37, 49.3, 49.2

[56] References Cited

U.S. PATENT DOCUMENTS

| 3,117,441 | 1/1964 | Zimmerman | 73/37 |
| 3,667,281 | 6/1972 | Pfeifer | 73/37 |
| 3,859,844 | 1/1975 | Hruby | 73/49.3 |
| 4,188,819 | 2/1980 | Egee et al. | 73/49.3 |
| 4,478,070 | 11/1984 | Clifford et al. | 73/49.3 |

FOREIGN PATENT DOCUMENTS

| 2280892 | 2/1976 | Fed. Rep. of Germany | 73/49.3 |
| 2836122 | 3/1979 | Fed. Rep. of Germany | 73/52 |
| 76432 | 5/1982 | Japan | 73/37 |
| 7810210 | 4/1980 | Netherlands | 73/52 |

Primary Examiner—Stewart J. Levy
Assistant Examiner—Hezron E. Williams
Attorney, Agent, or Firm—Scully, Scott, Murphy & Presser

[57] ABSTRACT

This invention relates to measuring the pressure within a vacuum package comprising a flexible, gas-tight film. The package is placed within a bell jar in which a vacuum is generated, and the pressure variation is measured as function of the time.

5 Claims, 7 Drawing Figures

METHOD OF MEASURING THE PRESSURE IN A VACUUM PACKAGE

The packaging of all sorts of commodities in flexible films, in particular foodstuffs, is often effected under vacuum, at any rate under a pressure much lower than atmospheric pressure. Such a package will hereinafter be designated by the term "vacuum package". In many cases it is of importance to determine the pressure within such a package. If the pressure is too high, this may be due to malfunctioning of the packaging machine. In other cases, it may imply that the packaged product produces gases, and was insufficiently degased before packaging. This may be the case, for example, with coffee. This product contains carbon dioxide which, after roasting and possibly grinding, is slowly released. In still other cases, an unduly high pressure may indicate microbiological contamination. In all these cases, it is of importance that such packages should not be circulated. "Soft" packages will not be accepted by the public, which in the case of contamination is of coarse a very wise decision.

In the case of vacuum-packaged coffee, it is conventional to check whether the pressure is not too high by sample testing. If the pressure is found to be too high immediately after packaging, this indicates malfunctioning of the vacuum bell jars in the packaging line, used for generating a reduced pressure within the package. If the pressure is correct immediately after packaging but, after some time, higher than desirable after this interval, this indicates that the coffee has been given insufficient time for degasing prior to packaging.

Hitherto the pressure has been measured as follows: the package is placed in a rigid bell jar, the chamber is hermetically sealed, and the pressure within the chamber is reduced by means of a vacuum pump until the pressure within the bell jar is lower than that within the package. When the pressure within the bell jar becomes lower than that within the package, the package will be expanded. The pressure at which this takes place is either visually observed (e.g. U.S. Pat. No. 3,667,281) or detected by a sensor (e.g. GB Pat. No. 2,059,381).

The method used has the following disadvantages: the pressure which is determined by means of a sensor is the pressure which prevails within the package when the package has already been sufficiently expanded to move the sensor. This pressure is often lower than that prevailing within the package when the pressure around the package is atmospheric. In fact, if the packaging material has preferential places of bulging when the surrounding pressure is less than that within the package, the sensor's reaction may be too late. That visual detection is little reliable will be self-evident. Furthermore, when the vacuum package is contained in an outer wrapper, the methods described cannot be used. Dielectric methods (e.g. GB Pat. No. 2,059,381) are also difficult and rather inaccurate. This is partly due to the fact that the packages may differ in size and shape, while the dielectric constant of the packaging material is little different from the dielectric constant of air.

According to the present invention, there is provided a method of determining the pressure in a vacuum package comprising a flexible gas-tight film which may be surrounded by a non-gas-tight wrapper, characterized by placing the vacuum package, or at least a part of the surface of the film covering of the package, in a rigid bell jar adapted to be hermetically sealed from the outer air, and, by means of an electrical pressure sensor, measuring the pressure variation as a function of the time in the space between the package and the rigid bell jar when said space is connected, by means of a gas resistor, to a space in which a vacuum prevails, or at least a constant reduced pressure lower than the desired pressure within the package, and establishing the point at which the pressure variation begins to deviate from the pressure variation as it would develop when the volume of the package does not increase under the influence of said vacuum or at least constant reduced pressure.

The space between the package and the inner wall of the rigid bell jar is the "free volume".

By a rigid bell jar, as used in this specification, is understood a vessel means which is not deformed under the influence of a difference in pressure of at least one atmosphere between the interior and the exterior of the vessel means. The vessel means may have the shape of an inverted box, for example, with a seal being provided by a sealing means ensuring gas-tightness while being compressed. Such compression should preferably be such that as the interior pressure is reduced, there is no further change in volume. The sealing means may, for example, take the form of an elastic ring under the rim of the rigid bell jar. A vacuum as used herein normally means a pressure of, for example, 1 to 2 millibar.

The vacuum package need not be fully enclosed by the vessel means in every case. If the vacuum package has no outer wrapper, the rigid bell jar may be a small chamber which is open on one side, and which is held in contact with the package with the open side, like a stethoscope. When the bell jar is provided with an outstanding skirt in the form of a flexible film, such a skirt will adjust itself to any irregularities of the enveloping film of the vacuum pack under the influence of the drawing of a vacuum to form an air-tight seal. If the package is provided with a paper wrapper, there will be paper between the flexible film of the outstanding skirt and the foil enveloping the packaged product. This may jeopardize an hermetical seal. In this case the vacuum package may be bodily received in a flexible, hermetically sealable bag to which the bell jar is fixedly connected. It will be clear that as the chamber to be evacuated is smaller, the drawing of a vacuum requires less time.

A suitable gas resistor for the purposes of this invention is a capillary tube, but an accurately adjustable valve, for example, which is partially opened, is also suitable. Depending on the volume of the chamber to be evacuated, the gas resistor will preferably be so selected that (after all preparatory operations) measurement takes 1 to 3 seconds.

The invention will now be described in more detail with reference to the accompanying drawings, in which FIG. 1 diagrammatically shows an arrangement in which the package is bodily placed within a rigid bell jar;

Figure 5:
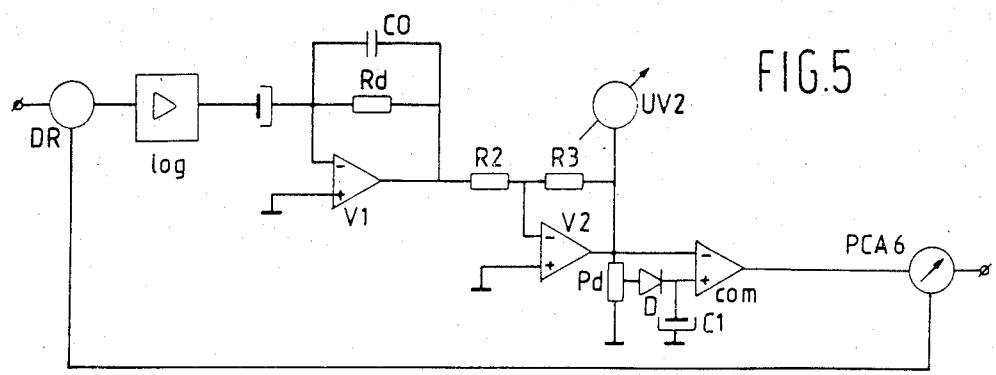
FIG. 5 shows a circuit arrangement corresponding to FIG. 4, in which ultimately a stop signal is generated by a digital volt meter, from which the pressure can be read.
Figure 6:
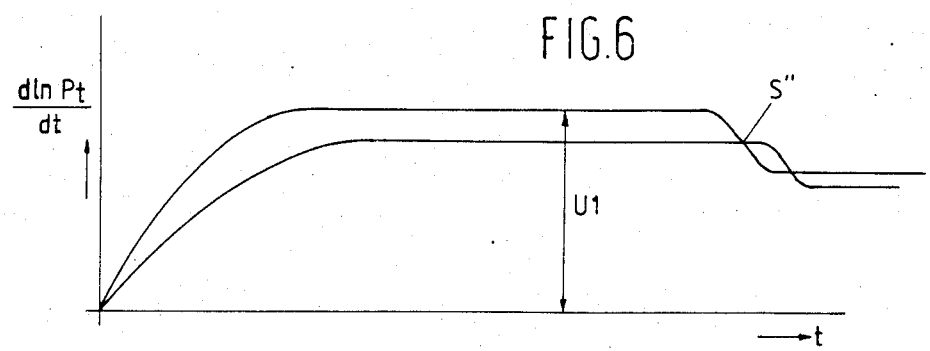
Figure 7:
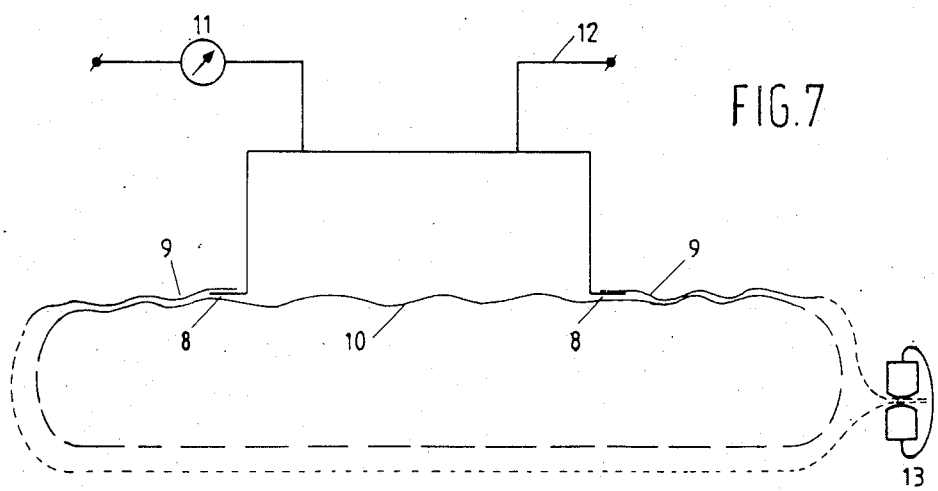

FIG. 6 indicates, in greater detail, as a function of the time, the variation of the first derived function of the logarithm of the pressure, as a function of the time, and also a reference level, derived therefrom using the circuit arrangement of FIG. 5;

FIG. 7 illustrates diagrammatically an arrangement in which a small rigid bell jar is held in contact with a portion of the enveloping film of the package. Shown in full lines is the situation in which the bell jar is provided with a flexible "skirt". Shown in ghost outline is the situation in which the bell jar forms part of a flexible bag, within which the package is received.

Figure 1:
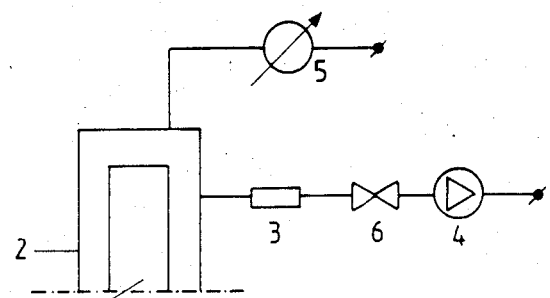
Figure 2:
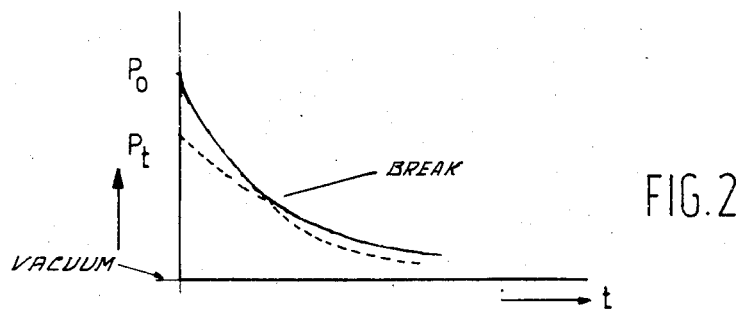
FIG. 2 shows the pressure variation as a function of the time when the space between the package and the rigid bell jar is connected to a vacuum pump.
Figure 3:
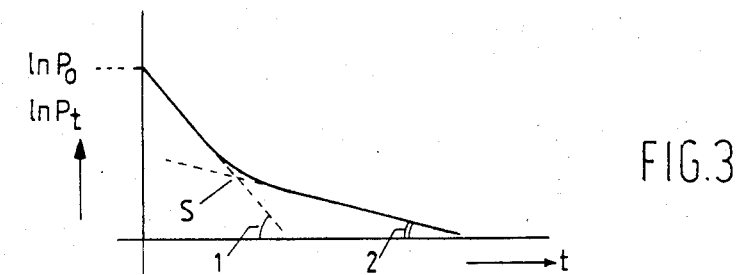
FIG. 3 shows the line indicating the logarithm of the pressure variation as a function of the time.

Referring now to the drawings, FIG. 1 shows a vacuum package 1, a rigid chamber, such as a bell jar 2, a gas resistor 3, a vacuum pump 4, an electrical pressure sensor 5, and a valve 6. The following is given by way of example. The rigid bell jar is a round box, made of aluminum with a total internal volume of 350 cm$^3$. This box is placed on a plate, and a seal is provided by means of an elastic (e.g. rubber) ring between the plate and the rim of the rigid bell jar. The gas resistor 3 is a capillary tube with an interiordiameter of 0.5 mm and a length of 5 mm. Valve 6 is of a type normally commercially available, and the electrical pressure sensor is Valydine DP15. Using this apparatus, excellent results were achieved with packages of vacuum packaged ground coffee with a volume of 250 cm$^3$, FIG. 2 shows the pressure variation ($P_t$), commencing with the pressure $P_o$ (normally atmospheric pressure) as a function of the time, after valve 6 in FIG. 1 has been opened. This pressure variation is indicated by the formula $P_t = P_o \cdot e^{-\tan xt}$, in which e is the natural base and x is a function of the gas resistance R and the free volume V of the space between the package 1 and the inner wall of the rigid bell jar 2. From the foregoing formula we infer: $\ln P_t = \ln P_o - \tan xt$. In FIG. 3, $\ln P_t$ is plotted against the time t. It is clear that when x is constant the line is straight. As $x = f \cdot RV$ (V = the free volume in the bell jar as defined hereinbefore) and R and f are constant, there is a relationship between x and V. When the film in which the product is packaged is going to expand, V and hence x become smaller. The slope of the line in FIG. 3 accordingly decreases, and the result is a configuration of two lines approximately as shown. The point S at which these lines intersect may, for example, be assumed as corresponding to the moment at which the film around the packaged product begins to expand. As that moment, the pressure within the free space of the rigid bell 2 would be equal to the pressure within the vacuum package. The pressure in the free space can be very accurately measured electrically. This is done, for example, by means of an electrical pressure gauge, which generates an electrical signal as a function of the pressure. This electrical signal can be processed in many ways, which are well known per se, to produce a clearly readable registration of the point of intersection S. Suitable examples are: a digital volt meter comprising a signal input and a so-called "stop" input, a twin-channel recorder capable of marking both the pressure as a function of the time and the logarithm of the pressure as a function of the time, or any other signal processing system (e.g. a computer).

Figure 4:
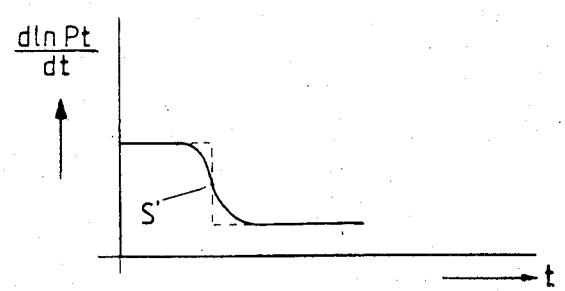
FIG. 4 shows the line indicating the first derived function of the lines of FIG. 3 (i.e. after differentiation) as a function of the time.

A particular embodiment of this registration is shown in FIG. 4, in which, as stated before, the first derived function $$\frac{d \ln P_t}{d_t}$$

is plotted against the time. The point of intersection S' corresponds to S in FIG. 3, and hence with the assumed pressure within the vacuum package.

The circuit arrangement shown in FIG. 5 is used to measured $$\frac{d \ln P_t}{d_t}$$

as a function of the time, corresponding to FIG. 4.

The electrical signal from the electrical pressure sensor DR (designated by 5 in FIG. 1) is supplied to the logarithm convertor "log". The input voltage (i) of this convertor can be defined as $Pt = P_o \cdot e^{-\tan xt}$; the output voltage then is $u = \ln Pt = \ln P_o \cdot e^{-\tan xt}$. This output voltage is supplied to a differentiating circuit comprising capacitors Cd and CO, resistor Rd and amplifier V1. The signal from this differentiating circuit is supplied to an inverting amplifier circuit consisting of amplifier V2 and resistors R2 and R3. By means of a potentiometer Pd, a portion of the output voltage (U2) from this inverting amplifier circuit is applied via diode D to capacitor C1, and supplied to comparator com. At the same time, the undivided output voltage (U1) is supplied direct to the comparator. It will be clear that U2 is smaller than U1, and is also trailing relatively to U1 (i.e. it is delayed). U2 is used as a reference level. In this comparator, the output voltage will e.g. be zero when the voltage at the minus input (U1) is higher than the voltage (U2) at the plus input. If the voltage at the minus input is less than that at the plus input, the output voltage will change to a few Volts (e.g. 5 Volt). This voltage is applied to the "hold" input of the digital volt meter PCA6. The volt meter indicates the output voltage of the pressure gauge DR.

When the "hold" voltage just referred to is supplied to volt meter PCA6, the latter stops at a value which, accordingly, corresponds to the pressure in the space between the package and the bell jar, and so, as assumed, with the pressure within the package.

The above is further illustrated by FIG. 6. In it, the upper line represents the values of $$\frac{d \ln P_t}{d_t}$$

which correspond to the above undivided voltage U1. The lower line represents $$\frac{d \ln P_t}{d_t}$$

corresponding to the delayed divided voltage U2. The point of intersection "S" indicates when the digital volt meter of FIG. 5 stops.

It has been suggested hereinbefore that the pressure thus determined does not exactly correspond to the pressure within the package. One of the reasons is that the package is slightly compressible (has a certain resiliency) so that when the package is in the atmosphere, the gas pressure within the package is different from that under the reduced pressure when the package is within the bell jar for the measurement. Another reason is that there is a certain randomness in the choice of the point "S": the "delayed" level of FIG. 6 can be a little or more below the undelayed level. If necessary, a correction can be applied by composing a correction table for a given kind of package. This can be done by using a method in which the interior of the package is directly connected to a pressure sensor.

Instead of the above-described analogue pressure recording circuit, a digital one can be used.

In addition to the pressure in a vacuum package, it is sometimes of importance to determine its volume, e.g., in connection with the wish to keep the volume of a package within certain limits. This volume depends on the bulk volume of the packaged product. Undesirable deviations from the bulk volume may occur, for example, by deviations in the fineness of grinding. It follows from the above formulae that: $\ln P_t = \ln P_o - x_t$. As $\ln P_o$ is constant, differentiation gives $$\frac{d\ln P_t}{d_t} = -\tan x.$$

This x can be seen from FIG. 6 and corresponds to the flat part of the curve for the undivided voltage $U_1$.

Now, $x = fRV$. If $fR$ is known (e.g. from a callibrated measurement with a known V), V can be calculated for each particular case. The free volume (i.e. between package and rigid bell jar) is equal to the total interior volume of the rigid bell jar ($V_k$) minus the volume of the package to be measured ($V_p$), which can be formulated as follows: $V = V_k - V_p$; from which it follows that $V_p = V_k - V$. When $V_k$ is known, and V has been determined as indicated above, $V_p$ can thus be calculated.

It is also possible to determine the rate of degasing in a vacuum packaged product, such as coffee, by measuring the pressure within the package at different moments. A faster method can be realized by closing valve 6 in FIG. 1 at the moment when the package begins to expand (S in FIG. 3), and connecting the free space within the rigid bell jar via a differential pressure gauge to a reference space having the same pressure at that moment. Owing to the degasing, the package expands, and the pressure within the free space increases. The increase in pressure can be very accurately determined by the differential pressure gauge. This data can be of importance to determine whether and, if so, after how long a total storage period, softening should be feared.

In FIG. 7, which illustrates the embodiment using a small "press" bell jar, the rigid bell jar is designated by 7 and has an integral rim 8. Rim 8 is fitted with a skirt of flexible film 9. When the bell jar is pressed into contact with the vacuum package with an irregularly formed packaging film 10, and vacuum is drawn through a gas resistor through line 12, the flexible foil 9 will fully comply with the irregularities of film 10, and form a hermetical seal between the interior of bell jar 7 and the outer air. Shown dotted in the Figure is the condition in which the small bell jar is formed integrally with a flexible bag in which the entire package is received. In this embodiment, 13 designates the hermetical seal of the flexible bag.

What I claim is:

1. A method of determining the pressure in a vacuum package when a product is packed in a flexible gas-tight film which may be surrounded by a non-gas-tight wrapper, comprising:

placing at least a part of the surface of the flexible gas-tight film covering of the package in a rigid chamber adapted to be hermetically sealed from the outer air, measuring, by means of an electrical pressure sensor, pressure variation as a function of time in the space between the package and said rigid chamber when said space is coupled through a gas resistor to a space in which a constant reduced pressure lower than the desired pressure within the package prevails, and establishing a transition point at which the pressure variation begins to deviate from the pressure variation existing before the volume of the package increases under the influence of said at least constant reduced pressure.

2. A method according to claim 1 characterized in that said pressure in said space between the package and said rigid chamber is translated into an electrical signal, which is fed as an input in an electrical circuit, said circuit being of such nature that an electrical output to be measured is substantially constant both before and after passing said transition point, but with a difference in magnitude.

3. A method according to claim 2 whereby said electrical output as a function of time corresponds with the grafical representation of the first algebraic derivative of the natural logarithm of the pressure as a function of time.

4. A method according to claim 1 wherein the vacuum package is placed in said rigid chamber.

5. A method according to claim 1 wherein the space between the package and said rigid chamber is coupled through a gas resistor to a space in which a vacuum prevails and wherein the transition point is established at the point at which the pressure variation begins to deviate from the pressure variation existing before the volume of the package increases under the influence of said vacuum.

* * * * *